(12) United States Patent
Shemtov et al.

(10) Patent No.: US 10,683,953 B2
(45) Date of Patent: Jun. 16, 2020

(54) CONDUIT FITTING SUITED FOR WET LOCATIONS

(71) Applicant: Atkore Steel Components, Inc., Coconut Creek, FL (US)

(72) Inventors: Sami Shemtov, Hollywood, FL (US); George Dalisay, Hollywood, FL (US)

(73) Assignee: Atkore Steel Components, Inc., Coconut Creek, FL (US)

( * ) Notice: Subject to any disclaimer, the term of this patent is extended or adjusted under 35 U.S.C. 154(b) by 221 days.

(21) Appl. No.: 15/665,490

(22) Filed: Aug. 1, 2017

(65) Prior Publication Data

US 2019/0040979 A1    Feb. 7, 2019

(51) Int. Cl.
*F16L 19/02*  (2006.01)
*F16L 19/06*  (2006.01)
*F16L 19/065*  (2006.01)
*H01R 13/52*  (2006.01)
(Continued)

(52) U.S. Cl.
CPC ......... *F16L 19/0218* (2013.01); *F16L 19/061* (2013.01); *H01R 13/5219* (2013.01); *H02G 3/0406* (2013.01); *H02G 3/06* (2013.01); *F16L 19/065* (2013.01)

(58) Field of Classification Search
CPC ... F16L 19/0218; F16L 19/065; F16L 19/061; F16L 15/00; F16L 19/00; F16L 19/005; F16L 19/04; F16L 19/043; F16L 19/055; F16L 47/16; F16L 17/063; F16L 37/105; F16L 58/182; F16L 33/18; H02G 3/0406; H02G 3/06; H01R 13/5219

USPC .... 285/151.1, 327, 335, 339, 341, 343, 353, 285/354, 355, 357, 393
See application file for complete search history.

(56) References Cited

U.S. PATENT DOCUMENTS 3,233,924 A * 2/1966 Stanley ............... F16L 19/0206
                                                      285/343
3,326,582 A * 6/1967 Currie ................. F16L 19/0206
                                                      285/341
(Continued)

FOREIGN PATENT DOCUMENTS

CN    202852236 U    4/2013
CN    205479876 U    8/2016
(Continued)

*Primary Examiner* — Zachary T Dragicevich
*Assistant Examiner* — William S. Choi

(57) ABSTRACT

Provided herein are conduit couplings and connector assemblies suitable for wet locations. In some embodiments, a connector assembly includes a conduit, a compression ring extending around the conduit, and a connector body extending around a conduit outer surface, wherein the connector body including first and second ends. The connector body may further include an inner cavity and an internal stop, wherein the inner cavity and the internal stop define first and second sections. The connector assembly may further include a sealing ring within the inner cavity, wherein the sealing ring is directly adjacent the stop, a compression seal extending around the conduit outer surface, wherein the compression seal is in abutment with the first end or the second end of the connector body, and a friction ring extending around the conduit outer surface, wherein the friction ring is in abutment with the compression ring and the compression seal.

17 Claims, 9 Drawing Sheets

(51) Int. Cl.
   *H02G 3/04*      (2006.01)
   *H02G 3/06*      (2006.01)

(56) References Cited

U.S. PATENT DOCUMENTS

| | | | |
|---|---|---|---|
| 5,957,509 A * | 9/1999 | Komolrochanaporn | ..................... F16L 19/12 285/343 |
| 6,851,728 B2 * | 2/2005 | Minami | ................ F16L 19/086 285/342 |
| 9,671,049 B1 * | 6/2017 | Crompton | ............. F16L 19/065 |
| 2004/0007874 A1 | 1/2004 | Minami | |
| 2004/0108721 A1 * | 6/2004 | Olson | ................. F16L 19/0218 285/357 |
| 2014/0145435 A1 * | 5/2014 | Zhu | ....................... F16L 19/061 285/355 |

FOREIGN PATENT DOCUMENTS

| CN | 20597881 U | 2/2017 |
|---|---|---|
| GB | 2447275 B | 9/2008 |

\* cited by examiner

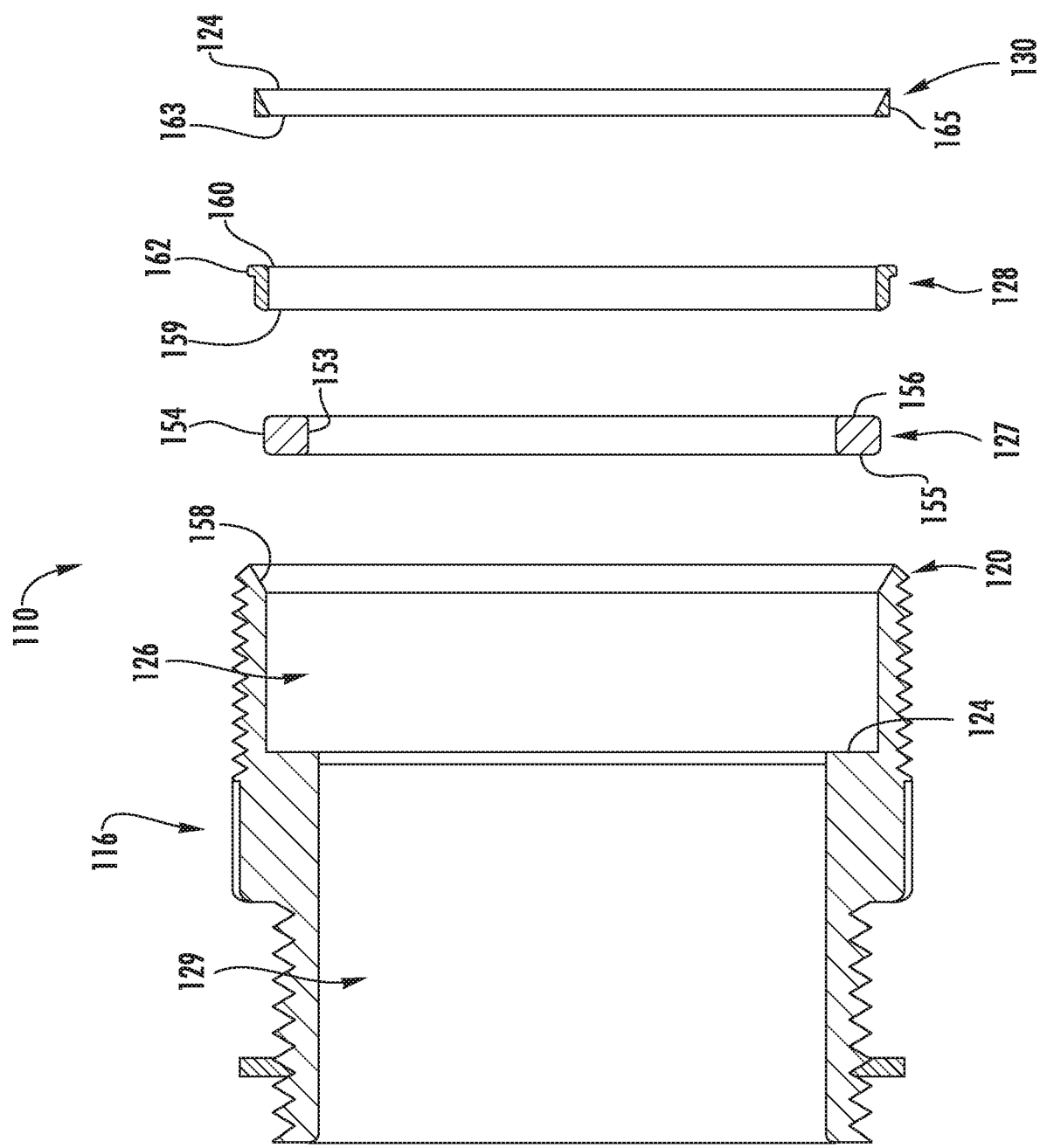

CONDUIT FITTING SUITED FOR WET LOCATIONS

FIELD OF THE DISCLOSURE

The disclosure relates generally to conduit connector assemblies and, more particularly, to conduit connector assemblies suitable for use within wet environments.

BACKGROUND OF THE DISCLOSURE

Electrical and mechanical components such as cables often need to be connected with each other through various angles and configurations. Conduits (e.g., pipes) and junction boxes may be used to house electrical cables, and connectors are used to join conduits with each other and/or with other components such as junction boxes in desired configurations. Connector assemblies make use of such connector elements as connector bodies, nuts, gaskets, etc., to provide the configurations desired for the conduits that house electrical and mechanical components.

The components brought together by connector assemblies can be sensitive to contaminants such as dust and moisture. If a proper seal is not formed between and among the elements of the connector assembly, the electrical and mechanical components may be susceptible to intrusion from such contamination, resulting in damage.

Furthermore, traditional connector assemblies are not able to accommodate both threaded and unthreaded conduits. For example, a connector assembly with a compression ring having a smooth inner surface is intended to secure unthreaded conduits. Similarly, existing repair coupling assemblies are intended to secure threaded conduits.

SUMMARY

In view of the foregoing, what is needed is a versatile connector assembly that provides superior resistance to contaminants like dust and moisture. Furthermore, what is needed is a connector assembly able to conveniently accommodate both threaded and unthreaded conduits in different situations.

An exemplary connector assembly in accordance with the present disclosure may include a conduit having a conduit inner surface opposing a conduit outer surface, a compression ring extending around the conduit outer surface, and a connector body extending around the conduit outer surface. The connector body may include an inner cavity, and a stop, wherein the inner cavity and the stop define a first section and a second section. The connector assembly may further include a sealing ring within the inner cavity, wherein the sealing ring is directly adjacent the stop, and a compression seal extending around the conduit outer surface, wherein the compression seal is in abutment with the connector body. The connector assembly may further include a friction ring extending around the conduit outer surface, the friction ring in abutment with the compression seal.

An exemplary conduit coupling according to embodiments of the disclosure includes a compression ring extending around a conduit outer surface of a conduit, and a connector body extending around the conduit outer surface. The connector body may include a first end opposite a second end, an inner cavity, and a stop, wherein the inner cavity and the stop define a first section and a second section. The conduit coupling may further include a sealing ring within the inner cavity, wherein the sealing ring is directly adjacent the stop, and a compression seal extending around the conduit outer surface, wherein the compression seal is in abutment with the first end or the second end of the connector body. The conduit coupling may further include a friction ring extending around the conduit outer surface, the friction ring in abutment with the compression ring and the compression seal.

Another exemplary connector assembly in accordance with the present disclosure may include a compression ring extending around a conduit, wherein the conduit includes a conduit outer surface and a conduit inner surface, and a connector body extending around the conduit outer surface, wherein the connector body includes a first end opposite a second end, an inner cavity, and a stop. The inner cavity and the stop may define a first section and a second section, wherein the conduit is received within the first section or the second section. The connector assembly may further include a sealing ring within the inner cavity, wherein the sealing ring is directly adjacent the stop, and a compression seal extending around the conduit outer surface, wherein the compression seal is in abutment with the first end or the second end of the connector body. The connector body may further include a friction ring extending around the conduit outer surface, the friction ring in abutment with the compression ring and the compression seal.

BRIEF DESCRIPTION OF THE DRAWINGS

The accompanying drawings illustrate exemplary approaches of the disclosed embodiments so far devised for the practical application of the principles thereof.

FIG. 3 is an exploded side cutaway view of a connector assembly in accordance with embodiments of the present disclosure.

FIG. 9 is an exploded side cutaway view of a connector assembly in accordance with embodiments of the present disclosure.

Figure 1:
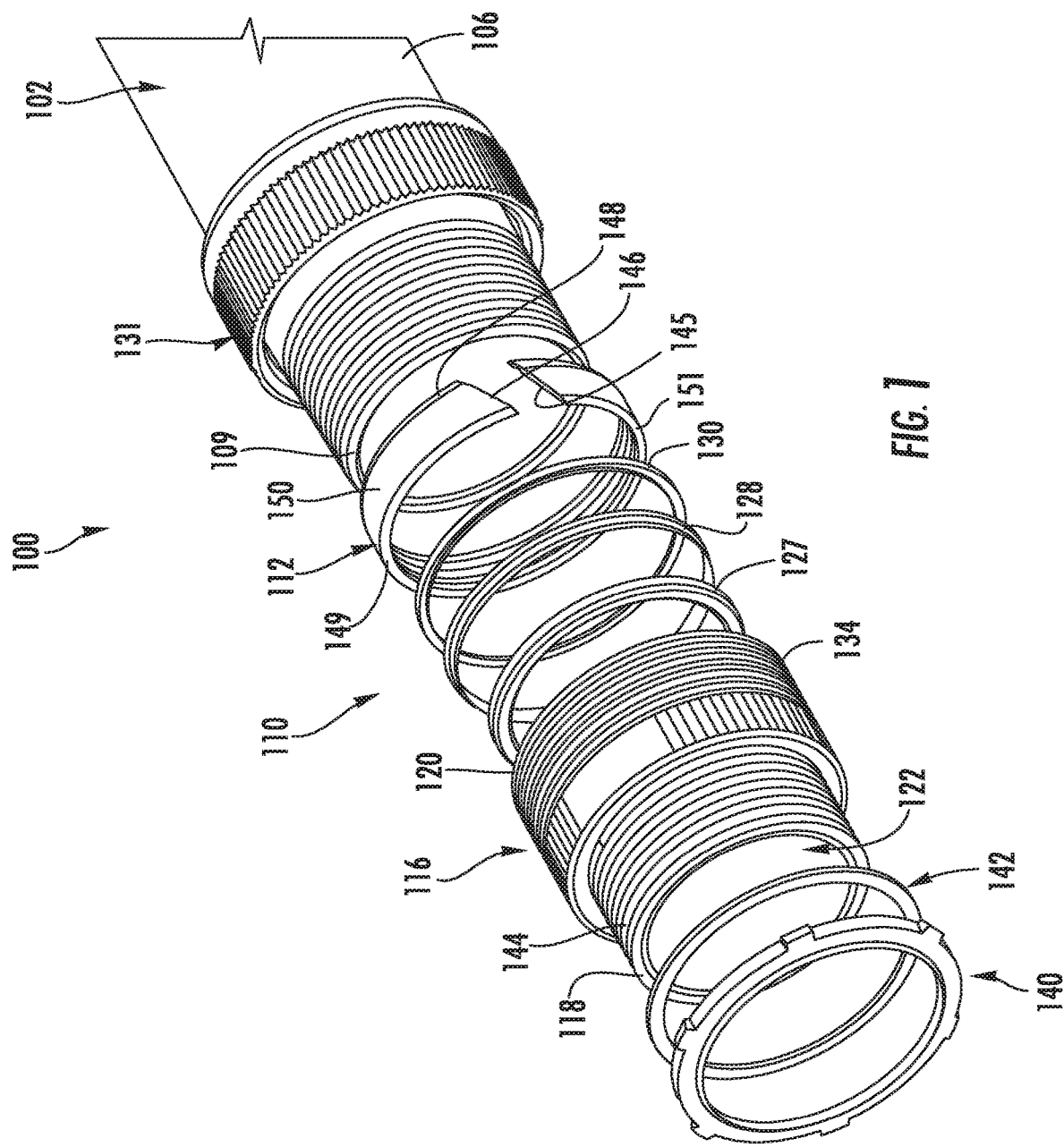
FIG. 1 is an exploded perspective view of a connector assembly in accordance with embodiments of the present disclosure.

The drawings are not necessarily to scale. The drawings are merely representations, not intended to portray specific parameters of the disclosure. The drawings are intended to depict exemplary embodiments of the disclosure, and therefore are not be considered as limiting in scope. In the drawings, like numbering represents like elements.

DETAILED DESCRIPTION

Multi-purpose conduit assemblies/fittings/couplings suitable for wet locations in accordance with the present disclosure will now be described more fully hereinafter with reference to the accompanying drawings, where embodiments of the conduit assemblies/fittings are shown. The assemblies may be embodied in many different forms and are not be construed as being limited to the embodiments set forth herein. Instead, these embodiments are provided so this disclosure will be thorough and complete, and will fully convey the scope of the system and method to those skilled in the art.

For the sake of convenience and clarity, terms such as "top," "bottom," "upper," "lower," "vertical," "horizontal," "lateral," and "longitudinal" will be used herein to describe the relative placement and orientation of these components and their constituent parts. The terminology will include the words specifically mentioned, derivatives thereof, and words of similar import.

As used herein, an element or operation recited in the singular and proceeded with the word "a" or "an" are understood as potentially including plural elements or operations as well. Furthermore, references to "one embodiment" of the present disclosure are not intended to be interpreted as precluding the existence of additional embodiments also incorporating the recited features.

Provided herein are conduit couplings and connector assemblies suitable for wet locations. In some embodiments, a connector assembly includes a conduit, a compression ring extending around the conduit, and a connector body extending around a conduit outer surface, wherein the connector body includes first and second ends. The connector body may further include an inner cavity and an internal stop, wherein the inner cavity and the internal stop define first and second sections. The connector assembly may further include a sealing ring within the inner cavity, wherein the sealing ring is directly adjacent the stop. The connector assembly may further include a compression seal extending around the conduit outer surface, wherein the compression seal is in abutment with the first end or the second end of the connector body. The connector assembly may further include a friction ring extending around the conduit outer surface, wherein the friction ring is in abutment with the compression ring and the compression seal.

In various embodiments, the conduit assembly may have two seals, namely an internal seal formed by the sealing ring, and an external seal formed by the compression seal and the friction ring. In some examples, the external compression seal may be effective to keep water from entering the conduit assembly when used with a non-threaded conduit, whereas the internal seal may be may be effective to keep water from entering the conduit assembly when using a threaded conduit. As a result, one fitting is versatile enough to allow the use of threaded and non-threaded pipes in wet locations.

Figure 2:
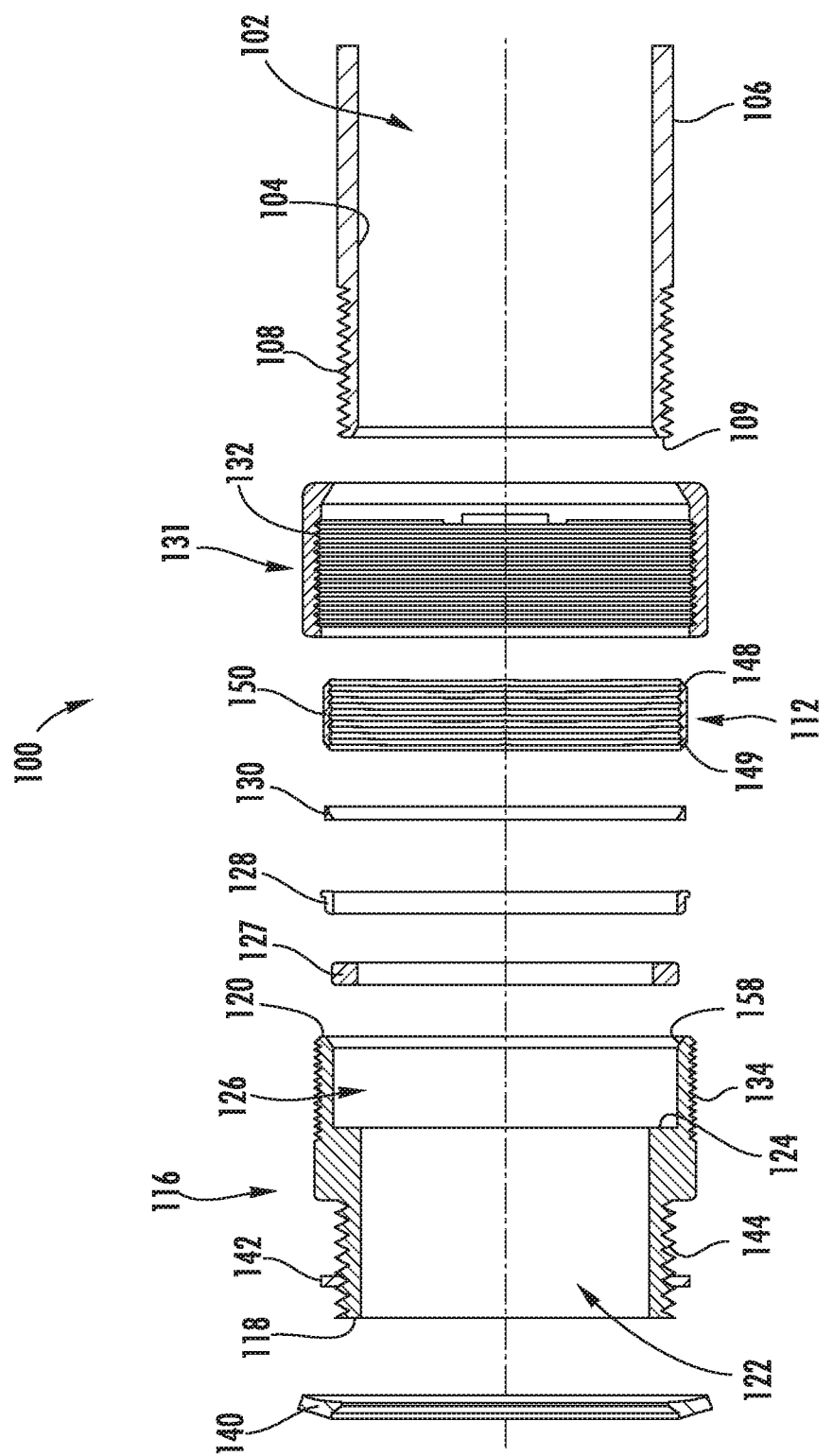
FIG. 2 is an exploded side cutaway view of a connector assembly in accordance with embodiments of the present disclosure.

Referring now to FIGS. 1-2, an exemplary embodiment of a connector assembly in accordance with the present disclosure is shown. The connector assembly 100 includes a conduit 102 having a conduit inner surface 104 opposing a conduit outer surface 106. As shown, the conduit outer surface 106 may include a threaded external surface 108 at an axial end 109 thereof. In other embodiments, for example as shown in FIG. 3B, the conduit outer surface 106 at the axial end 109 of the conduit 102 is unthreaded. The conduit 102 may be a rigid metal or polymer pipe suitable for installation in wet or damp locations. Embodiments herein are not limited to any particular type or size conduit, however.

The connector assembly 100 may include a conduit coupling 110 having a compression ring 112 arranged to extend around the conduit outer surface 106, for example, along the threaded external surface 108. The conduit coupling 110 further includes a connector body 116 configured to extend around the conduit outer surface 106, the connector body 116 including a first end 118 opposite a second end 120, an inner cavity 122, and a stop 124. The inner cavity 122 and the stop 124 define a first section 126 and a second section 129. In some embodiments, an inner diameter of the connector body 116 defined by the first section 126 is larger than an inner diameter of the connector body 116 defined by the second section 129. In other embodiments, the inner diameters of the first and second sections 126, 129 are the same or substantially the same.

The conduit coupling 110 may further include a sealing ring 127 arranged to nest within the inner cavity 122 of the connector body 116, a compression seal 128, and a friction ring 130. A locknut 140 and a washer 142 may be secured to the connector body 116, for example, along an external threaded surface 144 of the second section 129. The locknut 140 and washer 142 may be used, for example, when the conduit 102 is being coupled to a junction box (not shown). In some embodiments, the locknut 140 is made from steel, and the washer 142 is made from a polymer or rubber.

In some embodiments, the conduit coupling 110 may further include a compression nut 131 including an internal threaded section 132 for engagement with a threaded external surface 134 of the first section 126 of the connector body 116. The compression nut 131 may further extend around the conduit 102 when assembled, thereby securing the conduit coupling 110 to the conduit 102, as will be described in further detail below.

In some embodiments, the compression ring 112 includes a first circumferential end 145 and a second circumferential end 146 that is complementarily engageable with the first circumferential end 145. The compression ring 112 may also include a circumferential gap between the first circumferential end 145 and the second circumferential end 146. The circumferential gap of the compression ring 112 allows the compression ring 112 to compress, such compression bringing the first circumferential end 145 and the second circumferential end 146 closer together and narrowing the circumferential gap. In some embodiments, the circumferential gap narrows but need not necessarily close for a conduit to be secured to the connector body 116. In other embodiments, when the compression ring 112 is fully compressed, the first and second circumferential ends 145, 146 complementarily abut each other.

The compression ring 112 may optionally include a first bevel 148 for enhancing compression of the compression ring 112 via the interaction of the compression ring 112 with the compression nut 131. The compression ring 112 may also include a second bevel 149 for enhancing interaction of the compression ring 112 with the compression seal 128 and/or the friction ring 130.

As shown, the compression ring 112 further includes a compression ring outer surface 150 opposing a compression ring inner surface, which may include internal threading 151 (e.g., a set of teeth) extending radially inwardly from the compression ring inner surface. At least some of the internal threading 151 extend circumferentially from the first circumferential end 145 to the second circumferential end 146, allowing the teeth of the internal threading 151 to serve as an inner engagement mechanism, for example with the conduit outer surface 106 of the conduit 102.

It will be appreciated that the compression ring 112 may be shaped in a variety of different ways. For example, the compression ring 112 need not include first and second bevels 148, 149 in some embodiments. Furthermore, the complementarily interfittable circumferential ends 145, 146 can alternatively be shaped as complementary geometric shapes, curves, teeth, or any male/female combination of shapes that can fit together.

Referring now to FIG. 3, a combined internal and external sealing arrangement provided by the sealing ring 127, the compression seal 128, and the friction ring 130 of the conduit coupling 110 will be described in greater detail. As shown, the sealing ring 127 includes an inner surface 153 opposite an outer surface 154, and a first axial end 155 opposite a second axial end 156. In some embodiments, the sealing ring 127 is positioned within the first section 126 of the connector body 116 such that the first axial end 155 of the sealing ring 127 directly engages/abuts the stop 124, which may be a flange, shelf, or any surface that prevents axial movement of the sealing ring 127 further into the cavity 122 towards the second section 129. The second axial end 156 is configured to directly engage/abut the axial end 109 of the conduit 102 (FIGS. 1-2) to form a liquid impermeable seal therebetween. In some embodiments, a diameter of the outer surface 154 of the sealing ring 127 may be the same or substantially the same as the inner diameter of the connector body 116 defined by the first section 126. In various embodiments, the sealing ring 127 may be a continuous loop of rubber or a polymer.

The compression seal 128 is configured to engage the connector body 116, for example, at a chamfered surface 158 (e.g., a 30° slope) of the second end 120 of the connector body 116. As shown, an outer diameter of a first axial end 159 of the compression seal 128 is less than an outer diameter of a second axial end 160 of the compression seal 128. In some embodiments, the second axial end 160 may include a flange 162, or an area of increased thickness extending outwardly in a radial direction. During use, the flange 162 may prevent the compression seal 128 from fully entering the first section 126 of the connector body 116. That is, the compression seal 128 may remain in abutment with the chamfered surface 158 at the second end 120 of the connector body 116 to form a liquid impermeable seal therebetween. In some embodiments, the compression seal 128 may be a continuous loop of a polymer, such as nylon.

The friction ring 130 may be positioned directly adjacent the compression seal 128. As shown, the friction ring 130 may include a first axial end 163 and a second axial end 164, wherein the first axial end 163 abuts the compression seal 128. Specifically, in some embodiments, the friction ring 130 includes an angled surface 165 engaged with the second axial end 160 of the compression seal 128. The friction ring may partially nest within the compression seal, for example, along the second axial end 160. In some embodiments, the friction ring 130 is a continuous loop of steel used to apply an axial force to the compression seal 128 during assembly to form/maintain the seal between the compression seal 128 and the connector body 116.

Figure 4A:
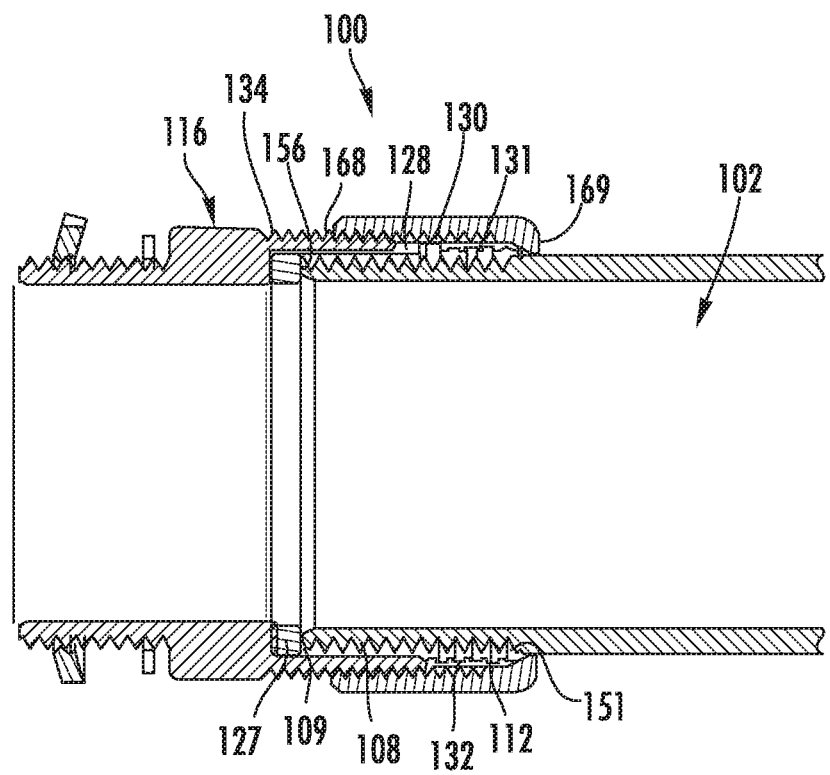
FIGS. 4A-B are side cutaway views a connector assembly in accordance with an embodiment of the present disclosure.
Figure 4B:
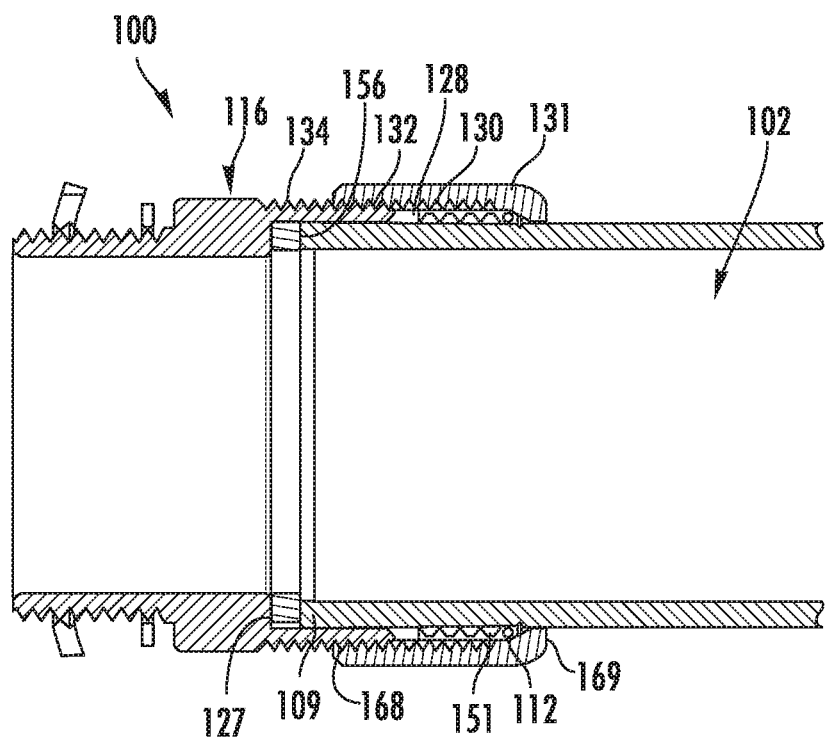

Turning now to FIGS. 4A-B, the connector assembly 100 will be described in greater detail. As shown, the connector body 116 is coupled to the conduit 102, wherein the conduit 102 may be threaded (FIG. 4A), or unthreaded (FIG. 4B). The conduit 102 may be inserted into the connector body 116 until the axial end 109 engages the second axial end 156 of the sealing ring 127. The compression seal 128, the friction ring 130, and the compression ring 112 are each secured about the conduit 102, wherein the internal threading 151 of the compression ring 112 engages with the threaded external surface 108 of the conduit 102. In some embodiments, the compression seal 128 and the friction ring 130 are compressed against the connector body 116 to form a seal therebetween. That is, the compression seal 128 is pressed against the 30° chamfer at the second end 120 of the connector body 116, the action of which reduces the internal diameter of the compression seal 128. The compression seal 128 internal diameter will reduce to the diameter of the conduit 102 and press against the chamfer surface 158. This will act as a barrier to prevent water from entering the connector body 116.

The compression ring 112 may then be further tightened by the compression nut 131. As shown, the compression nut 131 includes a first axial end 168 and a second axial end 169, wherein the internal threaded section 132 engages the threaded external surface 134 of the connector body 116. The second axial end 169 of the compression nut 131 may include a bevel or inner chamfer in engagement with the compression ring 112.

As the compression nut 131 is secured along the connector body 116, the compression ring 112 is compressed between the friction ring 130 and the inner chamfer of the compression nut 131. In the embodiment of FIG. 4A, the grip of the compression ring 112 on the threaded external surface 108 of the conduit 102 is enhanced as the compression ring 112 is squeezed by the compression nut 131. The pitch of the internal threaded section 132 of the compression ring 112 may match the pitch of the threaded external surface 108 of the conduit 102.

Figure 5:
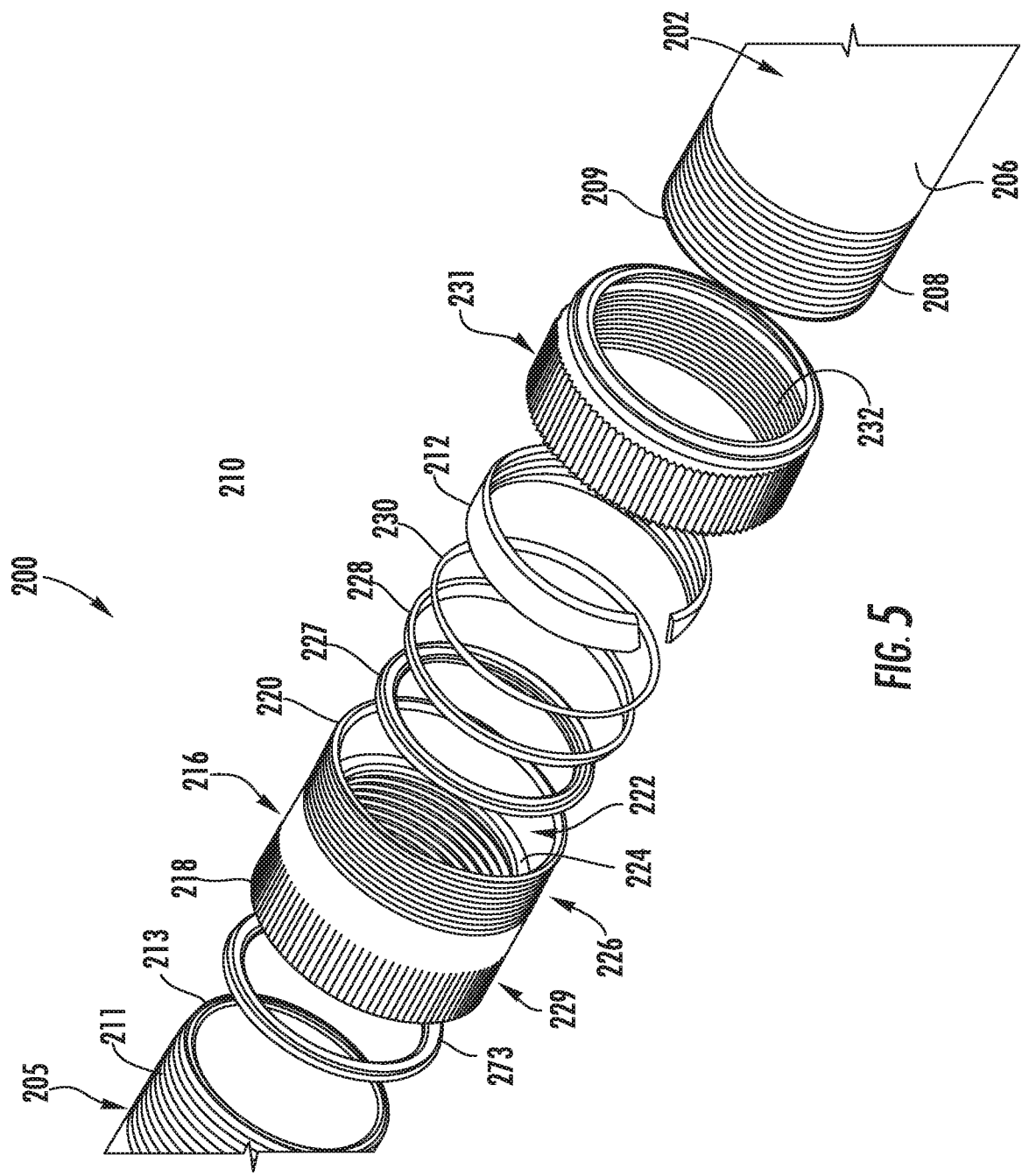
FIG. 5 is an exploded perspective view of a connector assembly in accordance with embodiments of the present disclosure.
Figure 6:
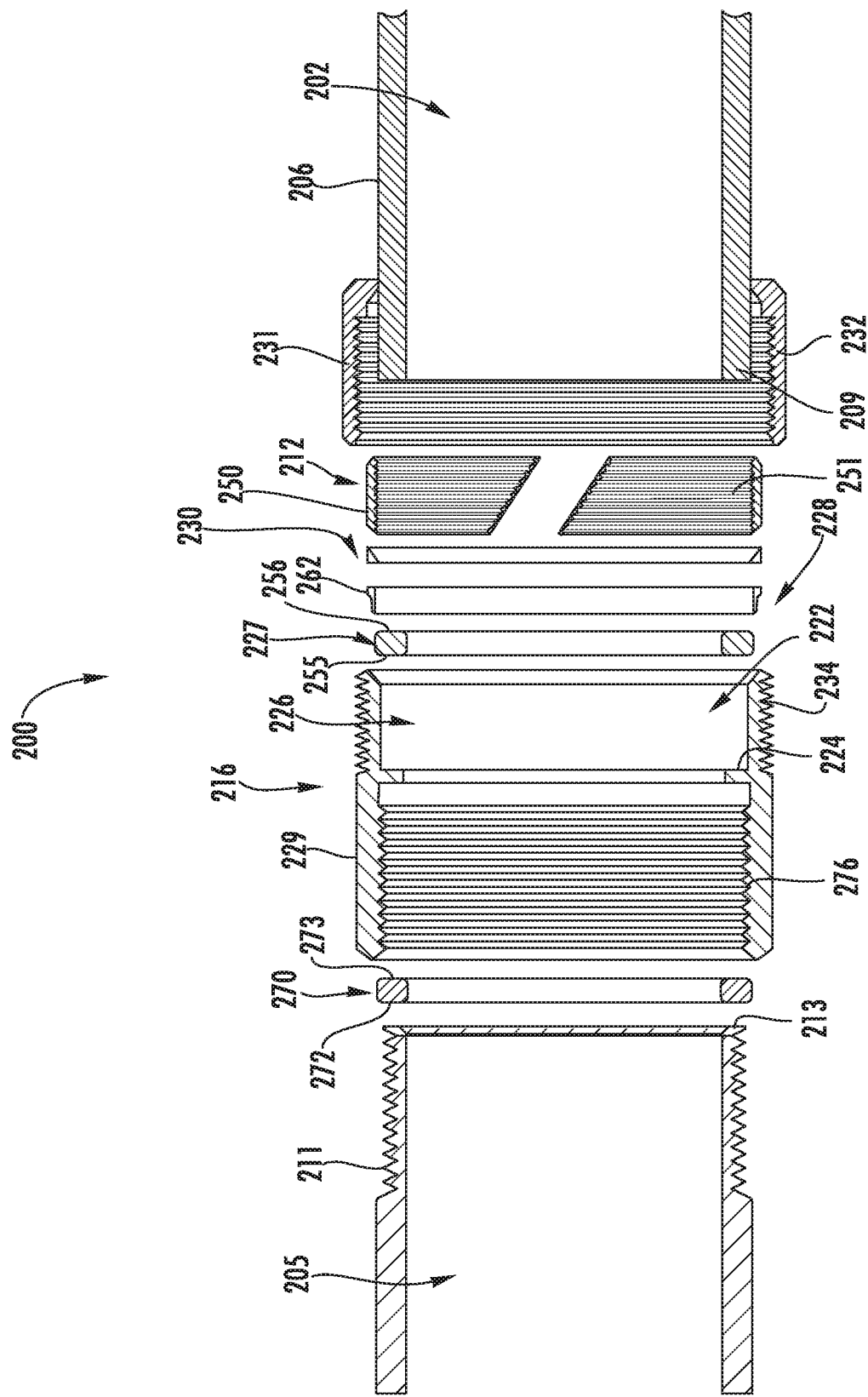
FIG. 6 is an exploded side cutaway view of a connector assembly in accordance with embodiments of the present disclosure.

Turning now to FIGS. 5-6, an exemplary embodiment of another connector assembly in accordance with the present disclosure is shown. The connector assembly 200 may include many or all of the features previously described in relation to the connector assembly 100 of FIGS. 1-4B. As such, only certain aspects of the connector assembly 200 will hereinafter be described for the sake of brevity. As shown, the connector assembly 200 includes a conduit 202 having a conduit outer surface 206. In some embodiments, the conduit outer surface 206 may include a threaded external surface 208 (FIG. 5) at an axial end 209 thereof. In other embodiments, for example as shown in FIG. 6, the conduit outer surface 206 at the axial end 209 of the conduit 202 is unthreaded. The conduit 202 may be a rigid metal or polymer pipe suitable for installation in wet or damp locations. Embodiments herein are not limited to any particular type or size conduit, however.

The connector assembly 200 may include a second conduit 205, which is coupled to the conduit 202 by a conduit coupling 210. In some embodiments, the second conduit 205 is similar or the same as the conduit 202, and includes a threaded external surface 211 at an axial end 213 thereof. The second conduit 205 and the conduit 202 may have the same or different inner and outer diameters. The second conduit 205 may be a rigid metal or polymer pipe suitable for installation in wet or damp locations. Embodiments herein are not limited to any particular type or size conduit, however.

The conduit coupling 210 may include a compression ring 212 arranged to extend around the conduit outer surface 206, for example, along the threaded external surface 208. The conduit coupling 210 further includes a connector body 216 configured to extend around the conduit outer surface 206, the connector body 216 including a first end 218 opposite a second end 220, an inner cavity 222, and a stop 224. The inner cavity 222 and the stop 224 define a first section 226 and a second section 229. In some embodiments, an inner diameter of the connector body 216 defined by the first section 226 is the same or substantially the same as an inner diameter of the connector body 216 defined by the second section 229. In other embodiments, the inner diameters of the first and second sections 226, 229 are different.

The conduit coupling 210 may further include a sealing ring 227, a compression seal 228, and a friction ring 230. The conduit coupling 210 of the connector assembly 200 may further include a compression nut 231 including an internal threaded section 232 for engagement with a threaded external surface 234 of the first section 226 of the connector body 216. The compression nut 231 may further extend around the conduit 202 and the compression ring 212 when assembled, thereby securing the connector body 216 to the conduit 202.

As shown, the compression ring 212 further includes a compression ring outer surface 250 opposing a compression ring inner surface, which may include internal threading 251 (e.g., a set of teeth) extending radially inwardly from the compression ring inner surface. At least some of the internal threading 251 serve as an inner engagement mechanism, for example, with the conduit outer surface 206 of the conduit 202.

As described above, a combined internal and external sealing arrangement may be provided by the sealing ring 227, the compression seal 228, and the friction ring 230. In some embodiments, the sealing ring 227 is positionable within the first section 226 of the connector body 216 such that a first axial end 255 of the sealing ring 227 directly engages/abuts the stop 224. As shown, the stop 224 may be a flange, shelf, or surface that prevents axial movement of the sealing ring 227 further into the inner cavity 222. A second axial end 256 of the sealing ring 227 is configured to directly engage/abut the axial end 209 of the conduit 202 to form a liquid impermeable seal therebetween. In some embodiments, a diameter of the outer surface of the sealing ring 227 may be the same or substantially the same as the inner diameter of the connector body 216 along the first section 226.

The compression seal 228 is configured to engage the connector body 216, for example, at a chamfered surface of the connector body 216. As shown, an outer diameter of one axial end of the compression seal 228 is greater than an outer diameter of a second axial end of the compression seal 228. In some embodiments, the second axial end 260 may include a flange 262 configured to prevent the compression seal 228 from fully entering the first section 226 of the connector body 216. Instead, the compression seal 228 may remain in abutment with the chambered surface 258 at the end of the connector body 216 to form a liquid impermeable seal therebetween. In some embodiments, the compression seal 228 may be a continuous loop of a polymer, such as nylon.

The friction ring 230 may be positioned directly adjacent the compression seal 228. As shown, the friction ring 230 may be engaged with the second axial end of the compression seal 228. In some embodiments, the friction ring 230 is a continuous loop of steel used to apply an axial force to the compression seal 228 during assembly to form/maintain the seal between the compression seal 228 and the connector body 216.

In this embodiment, the conduit coupling 210 may further include a second sealing ring 270 configured to nest within the second section 229 of the connector body 216. In some embodiments, the second sealing ring 270 is directly adjacent to and/or in direct contact with the stop 224. The second sealing ring 270 may include a first axial end 272 and a second axial end 273, wherein the first axial end 272 is in abutment with the axial end 213 of the second conduit 205 when the second conduit 205 engages the connector body 216, for example, via the threaded external surface 211 of the second conduit 205 and the threaded interior surface 276 of the connector body 216. Meanwhile, the second axial end 273 is in abutment with the stop 224 to provide a liquid impermeable seal therebetween.

Figure 7A:
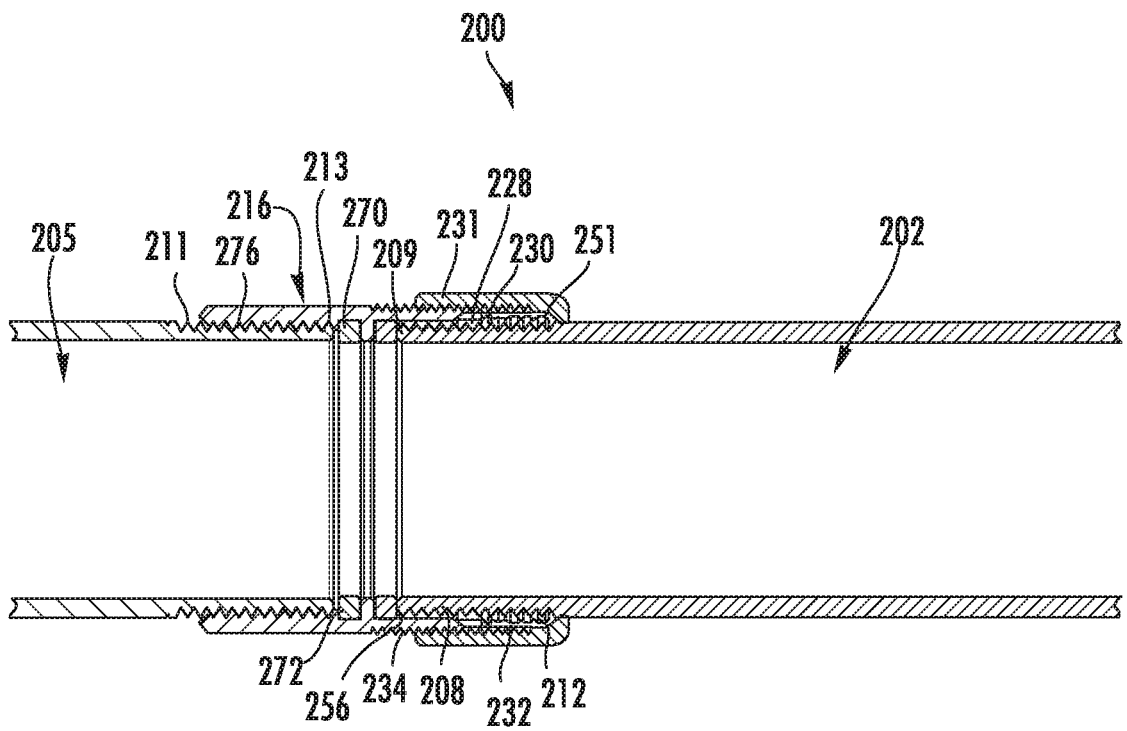
FIGS. 7A-B are side cutaway views a connector assembly in accordance with an embodiment of the present disclosure.
Figure 7B:
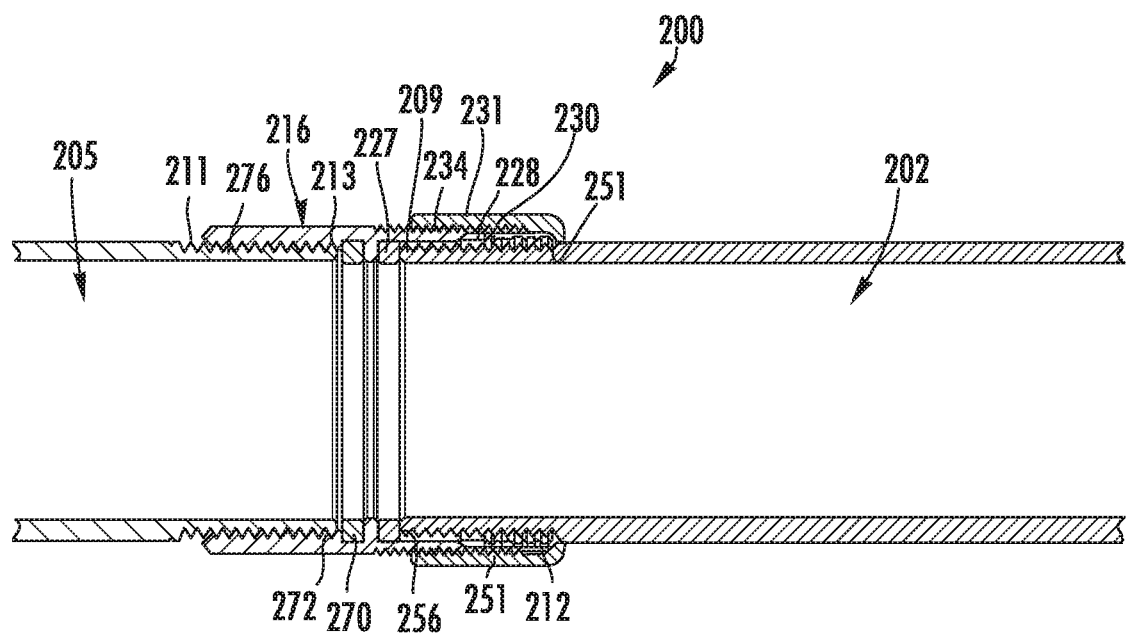

Turning now to FIGS. 7A-B, the connector assembly 200 will be described in greater detail. As shown, the connector body 216 is coupled to the conduit 202, wherein the conduit 202 may be threaded (FIG. 7A), or unthreaded (FIG. 7B). Similarly, the second conduit 205 may either be threaded or unthreaded. During connection, the conduit 202 may be inserted into the connector body 216 until the axial end 209 of the conduit 202 engages the second axial end 256 of the sealing ring 227. The compression seal 228, the friction ring 230, and the compression ring 212 are each secured about the conduit 202, wherein the internal threading 251 of the compression ring 212 engages with the threaded external surface 208 (FIG. 7A) of the conduit 202. In some embodiments, the compression seal 228 and the friction ring 230 are compressed against the connector body 216 to form a seal therebetween.

The second conduit 205 may similarly be inserted into the connector body 216 until the axial end 213 of the second conduit 205 engages the first axial end 272 of the second sealing ring 270. The threaded external surface 211 of second conduit 205 engages the threaded interior surface 276 of the connector body 216, further pressing the second sealing ring 270 against the stop 224 during tightening. The compression ring 212 may then be further tightened by the compression nut 231, wherein the internal threaded section 232 engages the threaded external surface 234 of the connector body 216. The compression nut 231 may include a bevel or inner chamfer (e.g., a 30° angled surface) in engagement with the compression ring 212.

As the compression nut 231 is secured along the connector body 216, the compression ring 212 is compressed between the friction ring 230 and the inner chamfer of the compression nut 231. The grip of the compression ring 212 on the threaded external surface 208 of the conduit 202 is enhanced as the compression ring 212 becomes more compressed by the compression nut 231. In the embodiment of FIG. 7A, the pitch of the internal threaded section 232 of the compression ring 212 may match the pitch of the threaded external surface 208 of the conduit 202.

Figure 8:
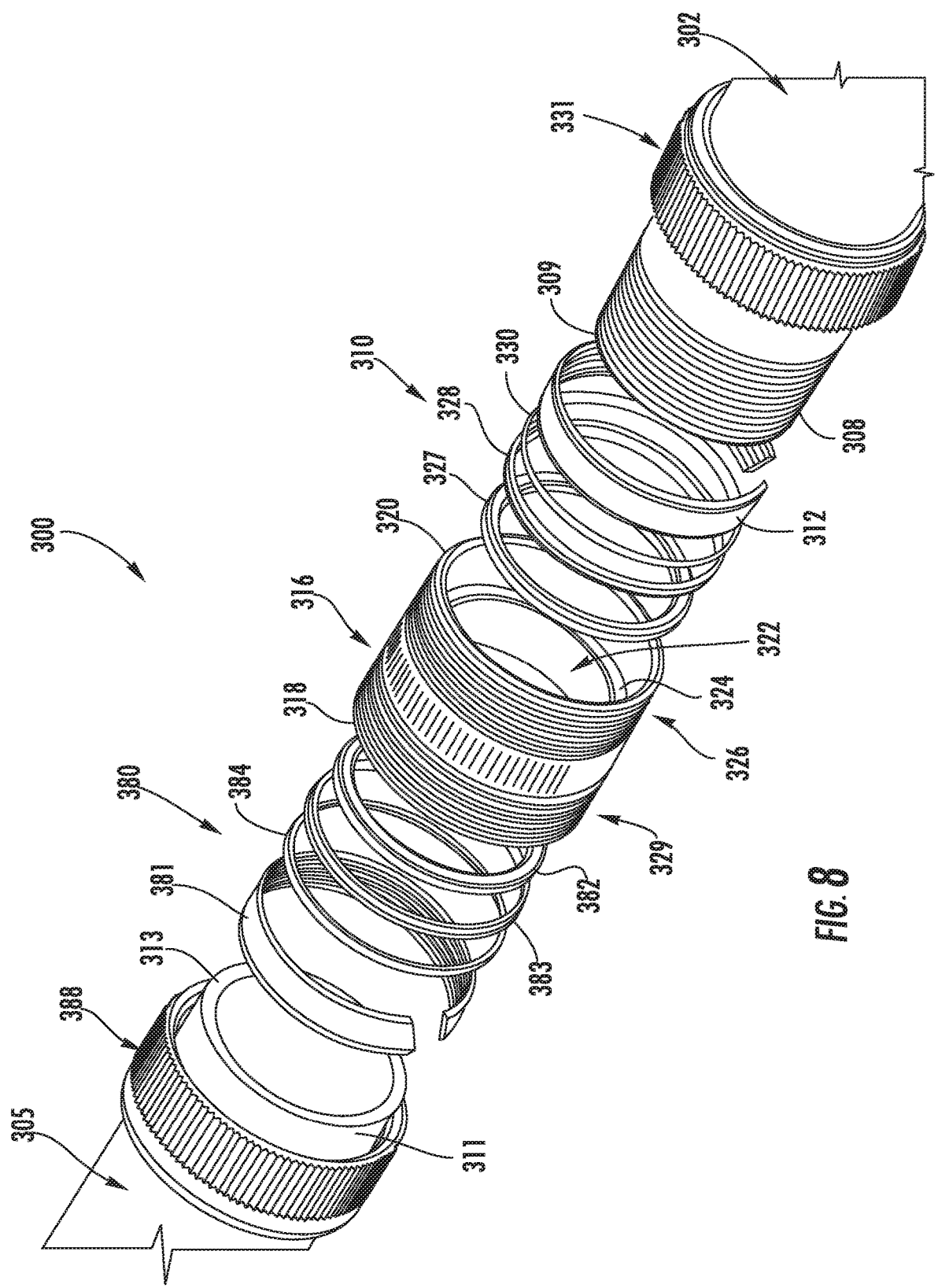

Turning now to FIG. 8, an exemplary embodiment of another connector assembly in accordance with the present disclosure is shown. The connector assembly 300 may include many or all of the features previously described in relation to the connector assembly 100 and connector assembly 200. As such, only certain aspects of the connector assembly 300 will hereinafter be described for the sake of brevity. As shown, the connector assembly 300 includes a conduit 302 and a second conduit 305 joined by a connector body 316. In some embodiments, a conduit outer surface of the conduit 302 may include a threaded external surface 308 at an axial end 309 thereof. Meanwhile, the second conduit 305 may include a non-threaded external surface 311 at an axial end 313 thereof. In other embodiments, the second conduit 305 may be threaded similar to the conduit 302. The conduit 302 and the second conduit 305 may be rigid metal or polymer pipes suitable for installation in wet or damp locations. Embodiments herein are not limited to any particular type or size conduit, however.

The connector assembly 300 may include a conduit coupling 310 having a compression ring 312 and the connector body 316, wherein compression ring 312 and the connector body 316 are configured to extend around the conduit 302. As shown, the connector body 316 includes a first end 318 opposite a second end 320, an inner cavity 322, and a stop 324. The inner cavity 322 and the stop 324 define a first section 326 and a second section 329. In some embodiments, an inner diameter of the connector body 316 defined by the first section 326 is larger than an inner diameter of the connector body 316 defined by the second section 329. In other embodiments, the inner diameters of the first and second sections 326, 329 are the same or substantially the same. As shown, each of the first and second sections 326, 329 may have external threaded surfaces for engagement, respectively, with a compression nut 331 and a second compression nut 388.

The conduit coupling 310 may further include a sealing ring 327 arranged to nest within the inner cavity 322 of the connector body 316, a compression seal 328, and a friction ring 330. In some embodiments, the conduit coupling 310 may further include the compression nut 331, which includes internal threading for engagement with external threading of the connector body 316. The compression nut 331 may further extend around the conduit 302 when assembled, thereby securing the conduit coupling 310 to the conduit 302.

The connector assembly 300 may include a second conduit coupling 380, which may be similar or the same as the conduit coupling 310. As shown, the second conduit coupling 380 may have a second compression ring 381, a second sealing ring 382 arranged to nest within the inner cavity 322 of the connector body 316, a second compression seal 383, and a second friction ring 384. In some embodiments, the second conduit coupling 380 may further include the second compression nut 388 including internal threading for engagement with the second section 329 of the connector body 316. The second compression nut 388 may further extend around the second conduit 305 when assembled, thereby securing the second conduit coupling 380 to the second conduit 305.

Figure 9A:
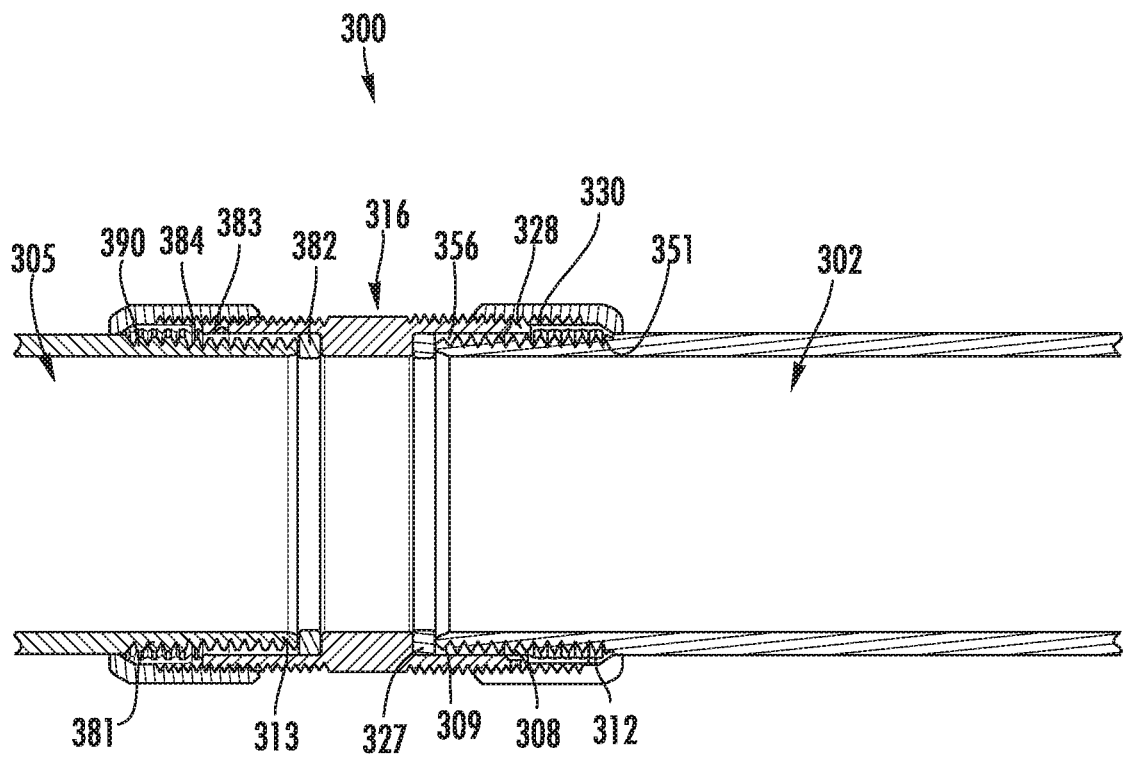
FIGS. 9A-B are side cutaway views a connector assembly in accordance with an embodiment of the present disclosure.
Figure 9B:
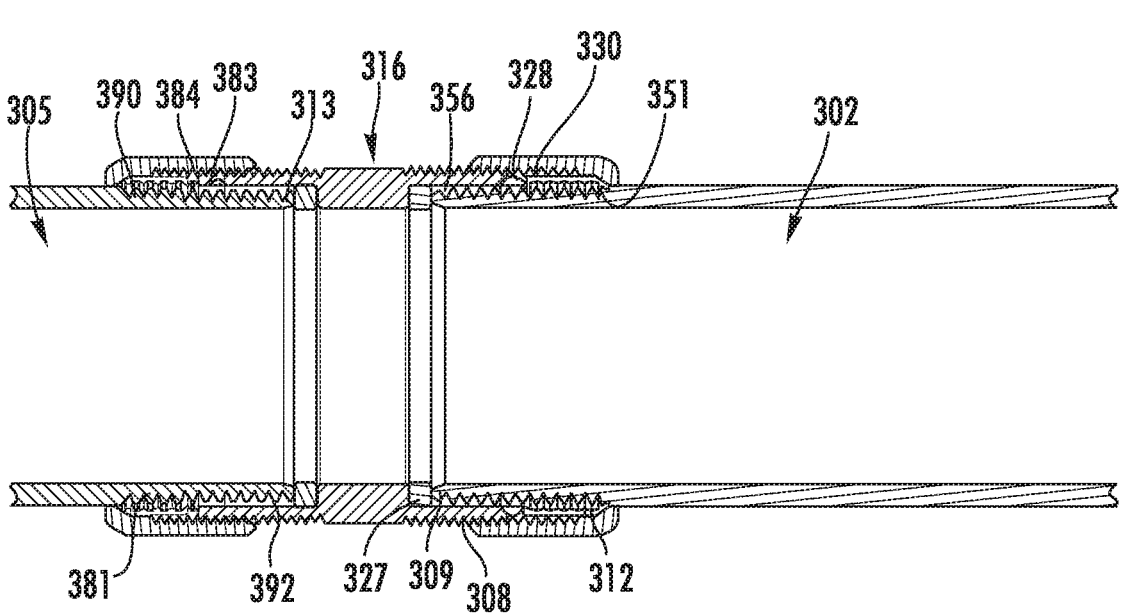

Turning now to FIGS. 9A-B, the connector assembly 300 will be described in greater detail. As shown, the connector body 316 is coupled to the conduit 302 and the second conduit 305, wherein each of the conduit 302 and the second conduit 305 may be threaded or unthreaded in various embodiments. During connection, the conduit 302 may be inserted into the connector body 316 until the axial end 309 of the conduit 302 engages the second axial end 356 of the sealing ring 327. The compression seal 328, the friction ring 330, and the compression ring 312 are each secured about the conduit 302, wherein the internal threading 351 of the compression ring 312 engages with the threaded external surface 308 of the conduit 302. In some embodiments in which the conduit 302 is unthreaded (e.g., FIG. 9B), the internal threading 351 of the compression ring 312 creates friction against the unthreaded surface, forming a seal therebetween. Furthermore, the compression seal 328 and the friction ring 330 are compressed against the connector body 316 to enhance the seal.

The second conduit 305 may similarly be inserted into the connector body 316 until the axial end 313 of the second conduit 305 engages the second sealing ring 382. The second compression seal 383, the second friction ring 384, and the second compression ring 381 are each secured about the second conduit 305, wherein internal threading 390 of the second compression ring 312 engages with the threaded external surface 392 of the second conduit 305.

The compression ring 312 and the second compression ring 381 may then be further tightened, respectively, by the compression nut 331 and the second compression nut 388. As each compression nut 331, 388 is secured along the external threaded surfaces the connector body 316, the compression rings 312, 381 are compressed between friction rings 330, 384 and the inner chamfer of the compression nuts 331, 388. The grip of the compression rings 312, 381 on the exterior of the conduit 302 and the second conduit 305 is enhanced as the compression ring 312 and the second compression ring 381 become more compressed, respectively, by the compression nuts 331, 388.

Embodiments described herein offer at least the following advantages. Firstly, unlike prior approaches in which long, heavy threaded pipes are turned or screwed into the connector body, turning of the conduit is not required. For example, conduits can have diameters of up to four inches, and with lengths of ten feet, can weigh about 150 pounds. When a conduit must be secured to a traditional connector assembly (or disengaged therefrom) by being screwed with complementarily threaded fittings, the user must rotate a heavy and bulky conduit in potentially tight spots. Because the threaded compression ring of this disclosure allows the compression ring to bite down into the conduit to secure the conduit to the connector assembly, it is not necessary to rotate large conduits to screw them into fittings in order to secure them in the field.

Secondly, the connector assembly may be used with an unthreaded conduit, thus reducing dirt and contamination caused by cutting and threading of conduits. Thirdly, the connection assembly may be rain-tight, allowing it to be used in wet locations.

While the present disclosure has been described with reference to certain approaches, numerous modifications, alterations and changes to the described approaches are possible without departing from the sphere and scope of the present disclosure, as defined in the appended claims. Accordingly, it is intended that the present disclosure not be limited to the described approaches, but that it has the full scope defined by the language of the following claims, and equivalents thereof. While the disclosure has been described with reference to certain approaches, numerous modifications, alterations and changes to the described approaches are possible without departing from the spirit and scope of the disclosure, as defined in the appended claims. Accordingly, it is intended that the present disclosure not be limited to the described approaches, but that it has the full scope defined by the language of the following claims, and equivalents thereof.

The invention claimed is:

1. A connector assembly comprising:
   a conduit having a conduit inner surface opposing a conduit outer surface;
   a compression ring extending around the conduit outer surface, wherein an internal threaded surface of the compression ring is engaged with a threaded external surface of the conduit outer surface;
   a connector body extending around the conduit outer surface, the connector body including an inner cavity, and a stop, wherein the inner cavity and the stop define a first section and a second section;
   a sealing ring within the inner cavity, wherein the sealing ring is directly adjacent the stop;
   a compression seal extending around the conduit outer surface, the compression seal in abutment with the connector body; and
   a friction ring extending around the conduit outer surface, the friction ring in abutment with the compression seal.

2. The connector assembly of claim 1, further comprising a compression nut extending around the conduit, the compression nut directly coupled to the connector body.

3. The connector assembly of claim 2, wherein the first section of the connector body includes a threaded external surface engaged with the compression nut.

4. The connector assembly of claim 1, further comprising a locknut and a washer secured to the connector body.

5. The connector assembly of claim 1,
wherein the compression ring extends from a first circumferential end to a second circumferential end,
wherein the first circumferential end is complementarily engageable with the second circumferential end, and
wherein the compression ring includes a first axial end and a second axial end.

6. The connector assembly of claim 1,
wherein the compression seal has a first axial end and a second axial end, and
wherein an outer diameter of the second axial end is greater than an outer diameter of the first axial end.

7. The connector assembly of claim 1, wherein an end of the connector body includes a chamfered surface directly engaged with the compression seal.

8. A conduit coupling, comprising:
a compression ring extending around a conduit outer surface of a conduit, wherein an internal threaded surface of the compression ring is engaged with a threaded external surface of the conduit outer surface;
a connector body extending around the conduit outer surface, the connector body including a first end opposite a second end, an inner cavity, and a stop, wherein the inner cavity and the stop define a first section and a second section;
a sealing ring within the inner cavity, wherein the sealing ring is directly adjacent the stop;
a compression seal extending around the conduit outer surface, the compression seal in abutment with the first end or the second end of the connector body; and
a friction ring extending around the conduit outer surface, the friction ring in abutment with the compression ring and the compression seal.

9. The conduit coupling of claim 8, further comprising a compression nut extending around the conduit, the compression nut directly coupled to the connector body.

10. The conduit coupling of claim 9, the first section of the connector body including a threaded external surface engaged with the compression nut, and the second section of the connector body including a threaded internal surface.

11. The conduit coupling of claim 8, further comprising a locknut and a washer secured to the connector body.

12. The conduit coupling of claim 8,
wherein the compression seal has a first axial end and a second axial end, and
wherein an outer diameter of the second axial end is greater than an outer diameter of the first axial end.

13. The conduit coupling of claim 8, wherein the first end or the second end of the connector body includes a chamfered surface in direct contact with the compression seal.

14. A connector assembly comprising:
a compression ring extending around a conduit, wherein the conduit includes a conduit outer surface having a threaded external surface engaged with an internal threaded surface of the compression ring;
a connector body extending around the conduit outer surface, the connector body including a first end opposite a second end, an inner cavity, and a stop, wherein the inner cavity and the stop define a first section and a second section, and wherein the conduit is received within the first section or the second section;
a compression seal extending around the conduit outer surface, the compression seal in abutment with the first end or the second end of the connector body; and
a friction ring extending around the conduit outer surface, the friction ring in abutment with the compression ring and the compression seal.

15. The connector assembly of claim 14, the first section of the connector body including a threaded external surface engaged with a compression nut, and the conduit is secured within the first section of the connector body.

16. The connector assembly of claim 14, wherein an axial end of the compression seal includes a radially extending flange.

17. The connector assembly of claim 14, wherein the first end or the second end of the connector body includes a chamfered surface in abutment with the compression seal.

* * * * *